(12) United States Patent
Clements et al.

(10) Patent No.: US 8,459,306 B2
(45) Date of Patent: Jun. 11, 2013

(54) FLEXIBLE PIPE HAVING PRESSURE ARMOUR LAYER

(75) Inventors: Richard Alastair Clements, Durham (GB); Zhimin Tan, Kathy, TX (US)

(73) Assignee: Wellstream International Limited, Newcastle-upon-Tyne (GB)

( * ) Notice: Subject to any disclaimer, the term of this patent is extended or adjusted under 35 U.S.C. 154(b) by 295 days.

(21) Appl. No.: 12/811,819

(22) PCT Filed: Dec. 17, 2008

(86) PCT No.: PCT/GB2008/004147
§ 371 (c)(1),
(2), (4) Date: Oct. 26, 2010

(87) PCT Pub. No.: WO2009/087348
PCT Pub. Date: Jul. 16, 2009

(65) Prior Publication Data
US 2011/0030831 A1 Feb. 10, 2011

(30) Foreign Application Priority Data
Jan. 7, 2008 (GB) .................................. 0800155.4

(51) Int. Cl.
*F16L 11/00* (2006.01)
(52) U.S. Cl.
USPC ............ 138/135; 138/134; 138/172; 138/174
(58) Field of Classification Search
USPC ................. 138/135, 129–131, 133, 134, 144, 138/172, 174
See application file for complete search history.

(56) References Cited

U.S. PATENT DOCUMENTS

| 1,068,553 | A | * | 7/1913 | Abell ............................. 138/135 |
| 4,377,186 | A | * | 3/1983 | Genini et al. .................. 138/111 |
| 5,269,349 | A | * | 12/1993 | Sugier et al. ................... 138/172 |
| 5,730,188 | A | | 3/1998 | Kalman et al. |
| 5,934,334 | A | * | 8/1999 | Gray et al. ..................... 138/112 |
| 6,253,793 | B1 | | 7/2001 | Dupoiron et al. |
| 6,415,825 | B1 | | 7/2002 | Dupoiron et al. |
| 6,701,969 | B2 | * | 3/2004 | Wilson .......................... 138/137 |

OTHER PUBLICATIONS

International Preliminary Report on Patentability and Written Opinion of the International Searching Authority, mailed Jul. 22, 2010, for corresponding International Application No. PCT/GB2008/004147.
International Search Report and Written Opinion of the International Searching Authority, mailed May 7, 2009, for corresponding International Application No. PCT/GB2008/004147.

* cited by examiner

*Primary Examiner* — Patrick F Brinson
(74) *Attorney, Agent, or Firm* — Klarquist Sparkman, LLP (57) ABSTRACT

A flexible pipe body and a method of manufacturing flexible pipe body and a tape used during the manufacturing are disclosed. The flexible pipe body includes at least one layer of helically wound tape, adjacent windings in the layer of tape being interlocked by a hooked region of a winding nested in a valley region of an adjacent winding wherein the tape has a cross-sectional profile comprising a first contact surface and parallel spaced apart side walls substantially perpendicular to the contact surface.

25 Claims, 6 Drawing Sheets

FLEXIBLE PIPE HAVING PRESSURE ARMOUR LAYER

CROSS REFERENCE TO RELATED APPLICATIONS

This is the U.S. National Stage of International Application No. PCT/GB2008/004147, filed Dec. 17, 2008, which in turn claims the benefit of and priority to Great Britain Application No. GB0800155.4, filed Jan. 7, 2008.

The present invention relates to flexible pipes which may be used to convey fluids such as production fluids. In particular, but not exclusively, the present invention relates to flexible pipe body and a method for manufacturing flexible pipe body having a layer formed by interlocking adjacent windings of a helically wound tape.

Traditionally flexible pipe is utilised to transport production fluids, such as oil and/or gas and/or water, from one location to another. Flexible pipe is particularly useful in connecting a sub-sea location to a further sub-sea location or a sea level location. Flexible pipe is generally formed as an assembly of a length of flexible pipe body and one or more end fitting. The pipe body is typically formed as a composite of tubular layers of material that form a fluid and pressure containing conduit. The pipe structure allows large deflections without causing bending stresses that impair the pipe's functionality over a desired lifetime. The pipe body is generally, but not necessarily, built up as a composite structure including metallic and polymer layers. Flexible pipe may be utilised as a flowline over land and/or at a sub-sea location. Flexible pipe may also be used as a jumper or riser.

In many prior known flexible pipes of this type a "pressure armour layer" is utilised to help reinforce an internal pressure sheath such as a fluid barrier or liner and prevent radial expansion and burst through due to differential pressure conditions acting across the pipe. The pressure armour layer is thus important for the pressure retainment capability of the flexible pipe. The pressure armour layer may also act as a principal reinforcement layer providing collapse resistance.

Typically the pressure armour layer which acts as a hoop strength layer is formed by helically winding one or more tapes about an underlying layer whereby adjacent tape windings interlock with a claw or hook at one edge of a tape winding interlocking with a corresponding recess or valley region at an opposite edge in an adjacent winding.

Prior known pressure armour profiles are numerous and many have a Zeta or S-shape. One such example is illustrated in the European Patent Application having Publication Number EP 0929767. This discloses a flexible conduit formed with a helically wound band of metal to provide resistance to burst pressure. The band has a leading edge lip or hook and a trailing edge hook which engage and interlock when the band is helically wound. The cross section of the band has an asymmetrical Z-shape profile with a main body section intermediate the band end edges. However, it is noted that the handling of such winding through manufacturing may be difficult due to the asymmetry of the wire. Effectively the wire wishes to roll over on its side during manufacturing. Also the wire profile of the pressure armour layer constrains the wire's width to height ratio such that it is difficult to get a profile having a relatively large width and height. The constraint to the wires width to height ratio limits the internal and/or external pressures which the pipe is able to withstand.

It is an aim of the present invention to at least partly mitigate the above-mentioned problems.

It is an aim of embodiments of the present invention to provide flexible pipe body including a pressure armour layer which is relatively simple to manufacture relative to prior known armour layers.

It is an aim of embodiments of the present invention to provide a pressure armour layer which can be included in flexible pipe body to improve burst resistance and collapse resistance and which is formed from one or more helically wound tapes having improved stability with respect to alternative prior known tape.

It is an aim of embodiments of the present invention to provide a pressure armour layer in which the cross section profile of tape wound in an interlocked fashion to provide the pressure armour layer, provides a layer thicker than layers formed via prior known techniques.

According to a first aspect of the present invention there is provided flexible pipe body for transporting production fluids, comprising:
  at least one layer of helically wound tape, adjacent windings in the layer of tape being interlocked by a hooked region of a winding nested in a valley region of an adjacent winding; wherein
  the tape has a cross-sectional profile comprising a first contact surface and parallel spaced apart side walls substantially perpendicular to the contact surface.

According to a second aspect of the present invention there is provided an elongate metallic tape for forming a layer of interlocked windings in flexible pipe body, a cross-section of the tape comprising:
  a hooked region and a valley region, a hooked region of a winding being nestable in a corresponding valley region of an adjacent winding to thereby interlock adjacent windings; and
  a first contact surface and parallel spaced apart side walls substantially perpendicular to the contact surface.

According to a third aspect of the present invention there is provided a method of manufacturing flexible pipe body, comprising the steps of:
  helically winding an elongate metallic tape for forming a layer around a substantially cylindrical under layer.

Embodiments of the present invention provide a pressure armour layer having enhanced features whereby the profile of tape used in a helical winding process improves stability of the tape as it is applied to the pipe due to the tape profile aspect ratio. Also an increased overall thickness of the profile with respect to prior known techniques allows the pressure armour layer to be thicker with just one layer of wire thus enabling the pipe to resist higher burst pressures and increased hydrostatic external pressure than is otherwise possible with prior known pressure armour layers.

Embodiments of the present invention include a recessed or inwardly turned upper surface in the cross section profile of the tape to avoid undesired contact with layers lying radially outside the pressure armour layer.

Embodiments of the present invention incorporate a groove or grooves at an upper region of the cross sectional profile of the tape in order to reduce weight per meter of wire and/or to receive inspection system such as optical fibres which may be utilised to assess stress in the tape. Also or alternatively heating/cooling systems for controlling the temperature of the pipe may be introduced into the groove or grooves as may permeated gas removal or introduction systems such as tubes of permeable material (or tubes having through holes bored therethrough) may be connected to the outside of the pipe through end fittings in order to drain a pipe annulus of gases or liquid or to introduce gases or liquids in order to control corrosion or remove corrosive chemicals from the annulus environment.

Embodiments of the present invention provide a tape which lies stably onto a pipe which improves handling of the tape through pipe manufacturing processes and allows an increase in an overall thickness of the tape layer without greatly increasing the overall width of the wire. The tape has a substantially "block-like" cross section generally resembling a square or rectangle. One upper corner region is partially cut-out to form a valley region whilst a hook extends out from a remainder upper corner region. The hook and valley regions interlock in adjacent juxtaposed windings to form an interlocked layer. The cross-sectional profile is therefore substantially symmetric and yet includes features which enable adjacent windings to be secured together so as to form an interlocked layer.

Embodiments of the present invention also include features able to reduce local stresses from forming in the tape and during wrapping of the tape around an inner layer. These features include, but are not limited to, increased corner radii at specific locations such as the internal radii in valley regions and mating external radii in nub regions. Also a region of the hook is recessed or tapered inwardly to avoid pressure being applied to the windings from outer layers.

Embodiments of the present invention will now be described hereinafter, by way of example only, with reference to the accompanying drawings in which.

In the drawings like reference numerals refer to like parts.

Figure 1:
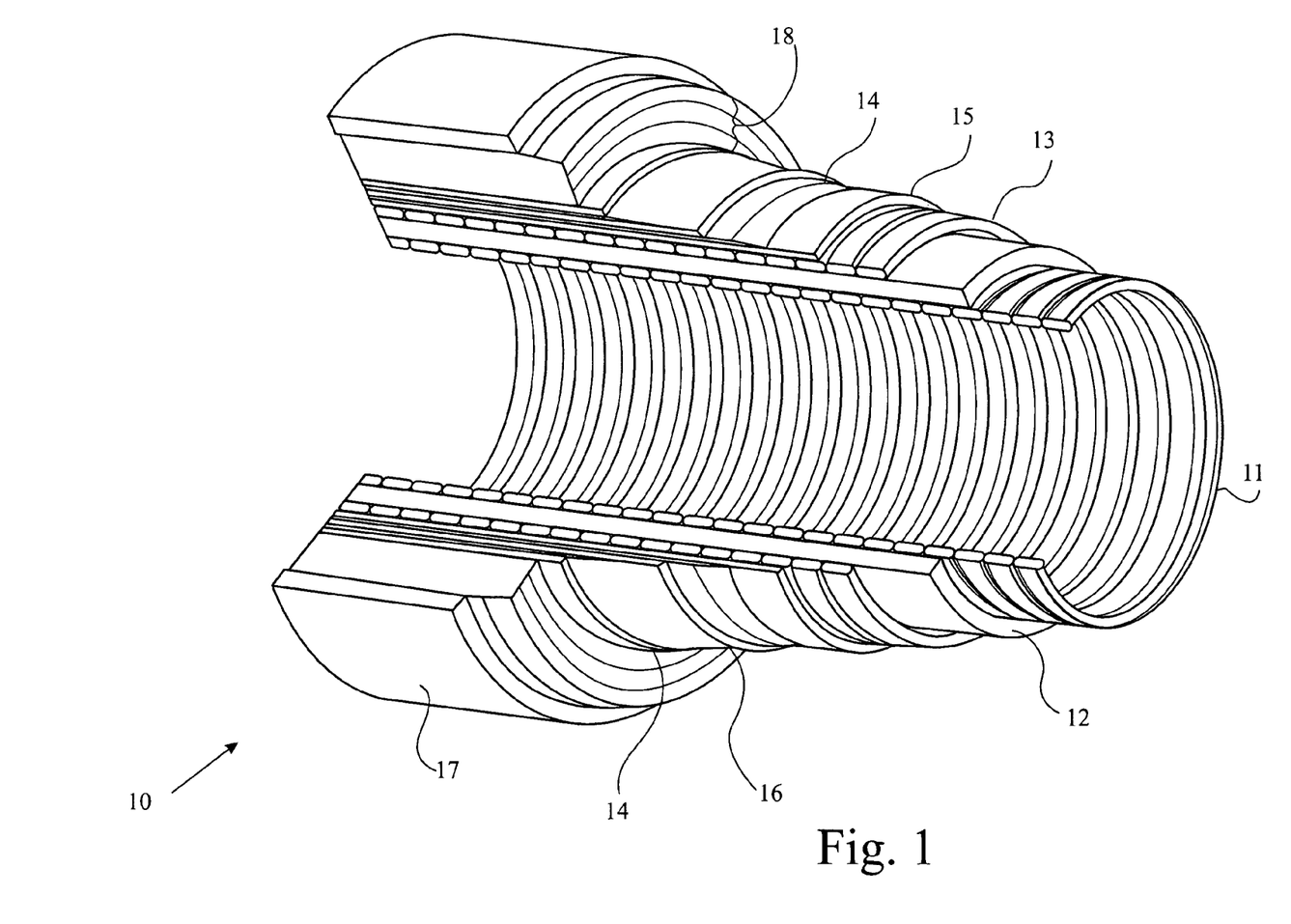
FIG. 1 illustrates flexible pipe body.

Throughout this specification reference will be made to a flexible pipe. It will be understood that a flexible pipe is an assembly of a portion of pipe body and one or more end fittings in each of which an end of the pipe body is terminated. FIG. 1 illustrates how a pipe body 10 is formed in accordance with an embodiment of the present invention from a composite of layered materials that form a pressure-containing conduit. Although a number of particular layers are illustrated in FIG. 1, it is to be understood that the present invention is broadly applicable to composite pipe body structures including two or more layers. It is to be further noted that the layer thicknesses are shown for illustrative purposes only.

As illustrated in FIG. 1, pipe body includes an innermost carcass layer 11. The carcass provides an interlocked metallic construction that can be used as the innermost layer to prevent, totally or partially, collapse of an internal pressure sheath 12 due to pipe decompression, external pressure, tensile armour pressure and mechanical crushing loads. It will be appreciated that embodiments of the present invention are applicable to 'smooth bore' as well as such 'rough bore' applications.

The internal pressure sheath 12 acts as a fluid retaining layer and typically comprises a polymer layer that ensures internal-fluid integrity. It is to be understood that this layer may itself comprise a number of sub-layers. It will be appreciated that when the optional carcass layer is utilised the internal pressure sheath is often referred to as a barrier layer.

In operation without such a carcass (so-called smooth-bore operation) the internal pressure sheath may be referred to as a liner.

A pressure armour layer 13 is formed over the internal pressure sheath and is a structural layer with a lay angle close to 90° that increases the resistance of the flexible pipe to internal and external pressure and mechanical crushing loads. The layer also structurally supports the internal-pressure sheath and typically consists of an interlocked metallic construction.

The flexible pipe body may also include one or more layers of tape 14 and a first tensile armour layer 15 and second tensile armour layer 16. Each tensile armour layer is a structural layer with a lay angle typically between 20° and 55°. Each layer is used to sustain tensile loads and internal pressure. The tensile armour layers are counter-wound in pairs.

The flexible pipe body also includes an outer sheath 17 which comprises a polymer layer used to protect the pipe against penetration of seawater and other external environments, corrosion, abrasion and mechanical damage. One or more layers 108 of insulation may also be included.

Each flexible pipe comprises at least one portion, sometimes referred to as a segment or section of pipe body 10 together with an end fitting located at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
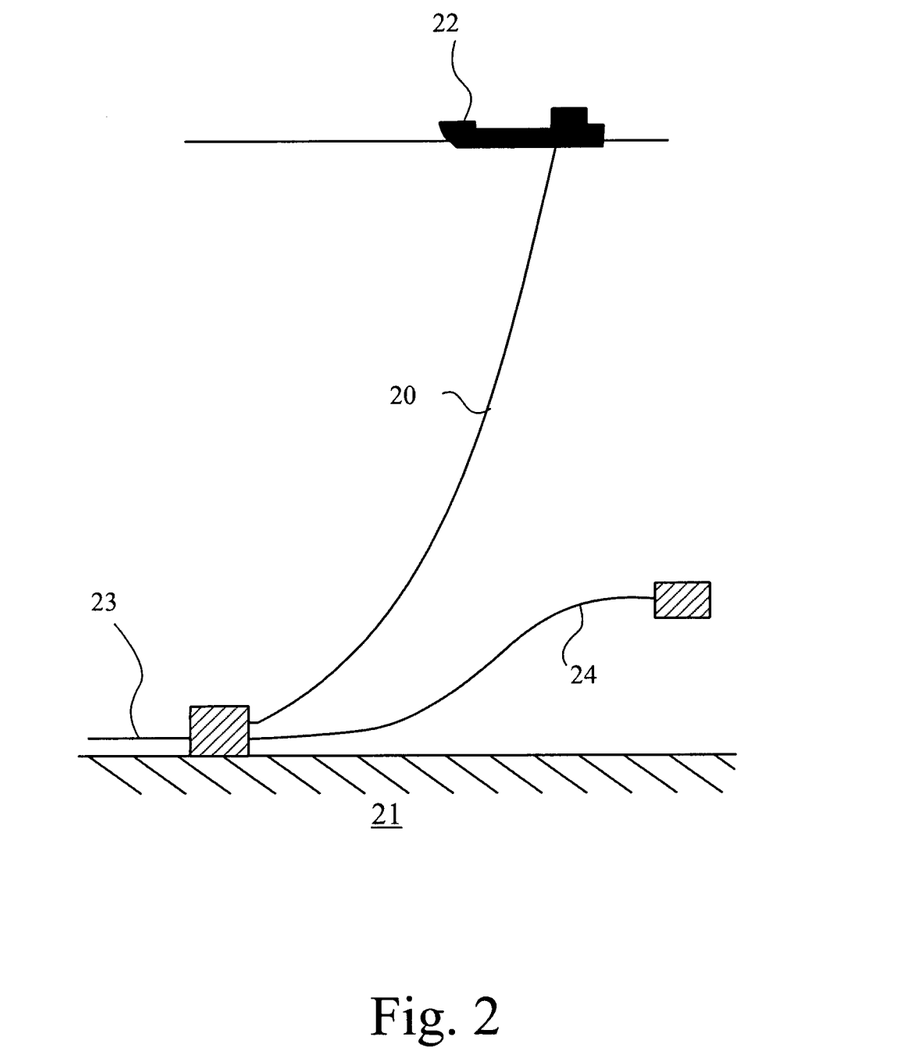
FIG. 2 illustrates a riser, flowline and jumper.

FIG. 2 illustrates a riser assembly 20 suitable for transporting production fluid such as oil and/or gas and/or water from a sub-sea location 21 to a floating facility 22. For example, in FIG. 2 the sub-sea location 21 is a connection to a sub-sea flow line 23. The flexible flow line comprises a flexible pipe, wholly or in part, resting on the sea floor or buried below the sea floor. The floating facility may be provided by a platform and/or buoy or, as illustrated in FIG. 2, a ship. The riser 20 is provided as a flexible riser, that is to say a flexible pipe connecting the ship to the sea floor installation. Alternatively the flexible pipe can be used as a jumper 24.

Figure 3:
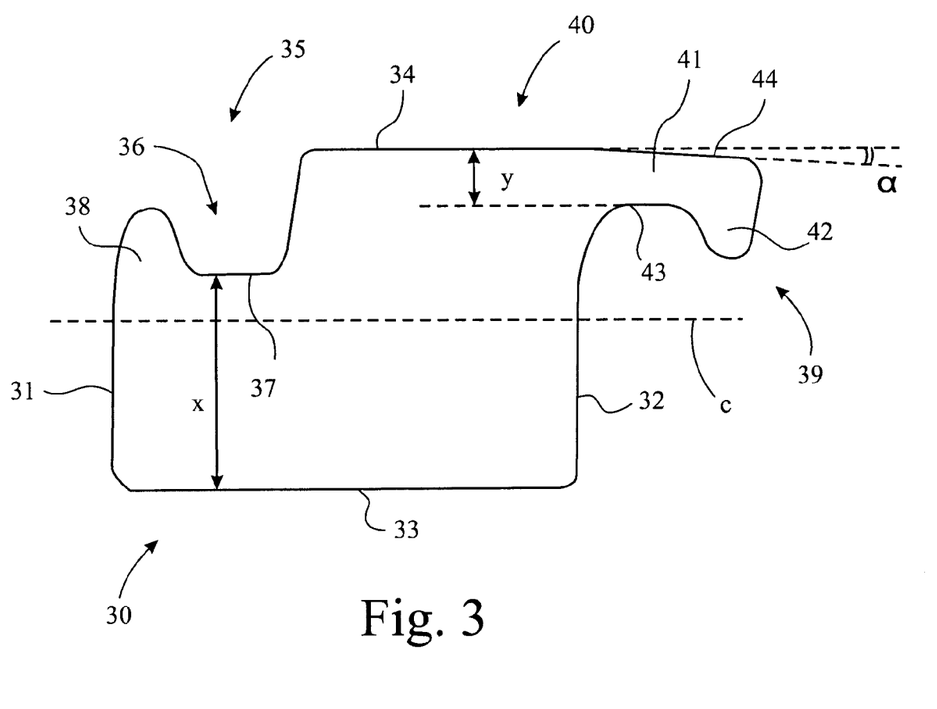
FIG. 3 illustrates the cross section/profile of a pressure armour tape.

FIG. 3 illustrates a cross section of a tape 30 according to an embodiment of the present invention. It will be understood that throughout this specification reference is made to a tape and it will be understood that such a term is to be broadly construed as encompassing any elongate structure having a preformed cross section that can be wound in a helical fashion around an underlying structure. The profile of the cross section has a substantially block-like nature with a first side wall 31 and a second, spaced apart and substantially parallel, side wall 32 arranged substantially perpendicular to a lower surface 33 which is substantially parallel to but spaced apart from a further upper surface 34. The side walls 31, 32 which are substantially parallel and spaced apart and upper and lower surfaces 33, 34 which are substantially parallel and spaced apart form an imaginary rectangle. An upper corner region 35 of the profile provides a "cut out" valley region 36 having a substantially planer valley floor surface 37 curving upwardly towards the upper surface 34. A lip region 38 is formed between the valley floor 37 and the first side wall 31. The upper corner region 35 thus provides a concave hook region. The floor 37 of the concave hook is offset from the lower surface 33 by distance x.

A convex hook 39 extends outwardly from a further upper corner region 40 in the profile with an arm region 41 terminating in a further lip 42. The lip 42 is turned inwardly towards a centre line C of the profile whilst the lip 38 of the concave hook is turned outwardly away from the centre line C. The convex hook 39 has a substantially planer floor 43 between the convex hook lip 42 and the further side wall 32. The planer surface of the floor of the convex hook is offset a distance y from the further upper surface 34 in the profile. The distance x is greater than the distance y. Aptly x is greater than 2.5y. There is thus a difference in the thicknesses of the two arms in the profile illustrated as distances x and y. The concave hook and convex hook of the profile are disposed to one common side of am imaginary centre line C passing horizontally through the profile and thus the centre line of a layer 13 formed by tape winding.

An upper surface 44 of the convex hook 39 is tapered inwardly towards the centre line C through an angle α from a projection of the upper surface 34. This prevents the arm of the convex hook being pressurised by outer layers of the flexible pipe body.

The overall cross section of the tape is shaped so as to make any asymmetry needed to provide the interlocking nature of the tape small with respect to the overall cross section. This is achieved by utilising a very thick arm region under the valley and a very thin arm region 41 of the hook 39. As a result the geometric centre of the profile is substantially non-offset from the geometric centre of an imaginary square or rectangle formed by the upper and lower surfaces 33, 34 and side walls 31, 32 of the tape. The centre of gravity associated with the cross section of tape is not offset or is only offset by a small amount from the centre of the lower contact surface 33 of the profile. As a result a greater stability is achieved in the tape during a laying process in which the layer 103 is generated. Also the tape windings will tend to lay more naturally once a layer has been formed.

Figure 4:
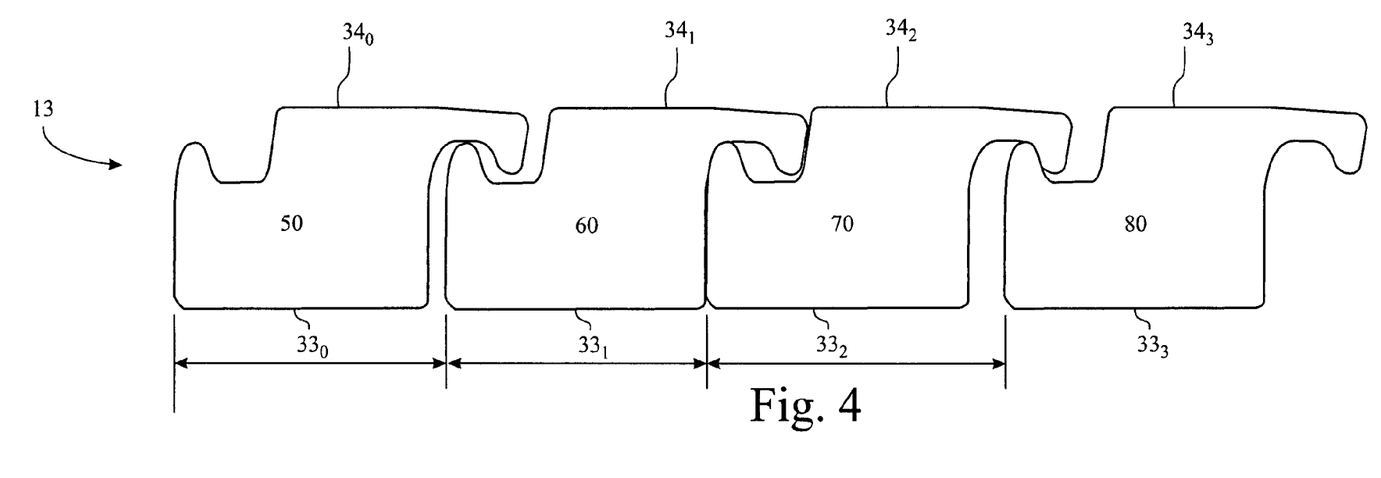
FIG. 4 illustrates a pressure armour layer of interlocked windings.

FIG. 4 illustrates how adjacent windings of the tape can be interlocked with the convex inwardly turned hook region 39 of a leading edge of a successive winding acting as a claw nesting in a complimentary valley region 36 of a trailing edge of a previous adjacent winding. Such a layer can be applied to a flexible pipe to improve burst resistance and collapse resistance with respect to prior known profiles. Features of the profile improve stability of the wire as it is applied to the pipe due to its aspect ratio.

As illustrated in FIG. 4 the lower contact surfaces $33_0$ to $33_3$ for the windings form a radially inner surface of the layer 13 whilst the further surfaces $34_0$ to $34_3$ in each respective winding together provide a radially outer surface of the pressure armour layer 13. The pitch between adjacent windings will vary depending upon how the flexible pipe flexes with the pitch illustrated between an adjacent winding 50 and a further adjacent 60 being a normal pitch, the pitch between an adjacent winding 60 and an adjacent winding 70 indicating a minimum pitch and a pitch between an adjacent winding 70 and an adjacent winding 80 indicating a maximum pitch. The length of each arm 41 of the convex hook is selected so that adjacent side walls of adjacent windings impact and take up the load rather than the outer surface of the hook contacting an adjacent winding between the horizontal part of the valley region and the upper surface 34. The width of the arm of the valley region and the arm of the hook region are sufficiently long to allow a desired amount of movement between adjacent windings so as to enable the flexible pipe body to flex. The nub regions forming the lips prevent adjacent windings becoming non-interlocked.

As illustrated in FIG. 3 the upper surface 34 tapers at an angle α away from a projection of the outer surface. Alternatively the upper surface may be recessed as described hereinbelow. This reduces the effect on the profile of radially inwardly directed pressure exerted by overlying layers.

Figure 5:
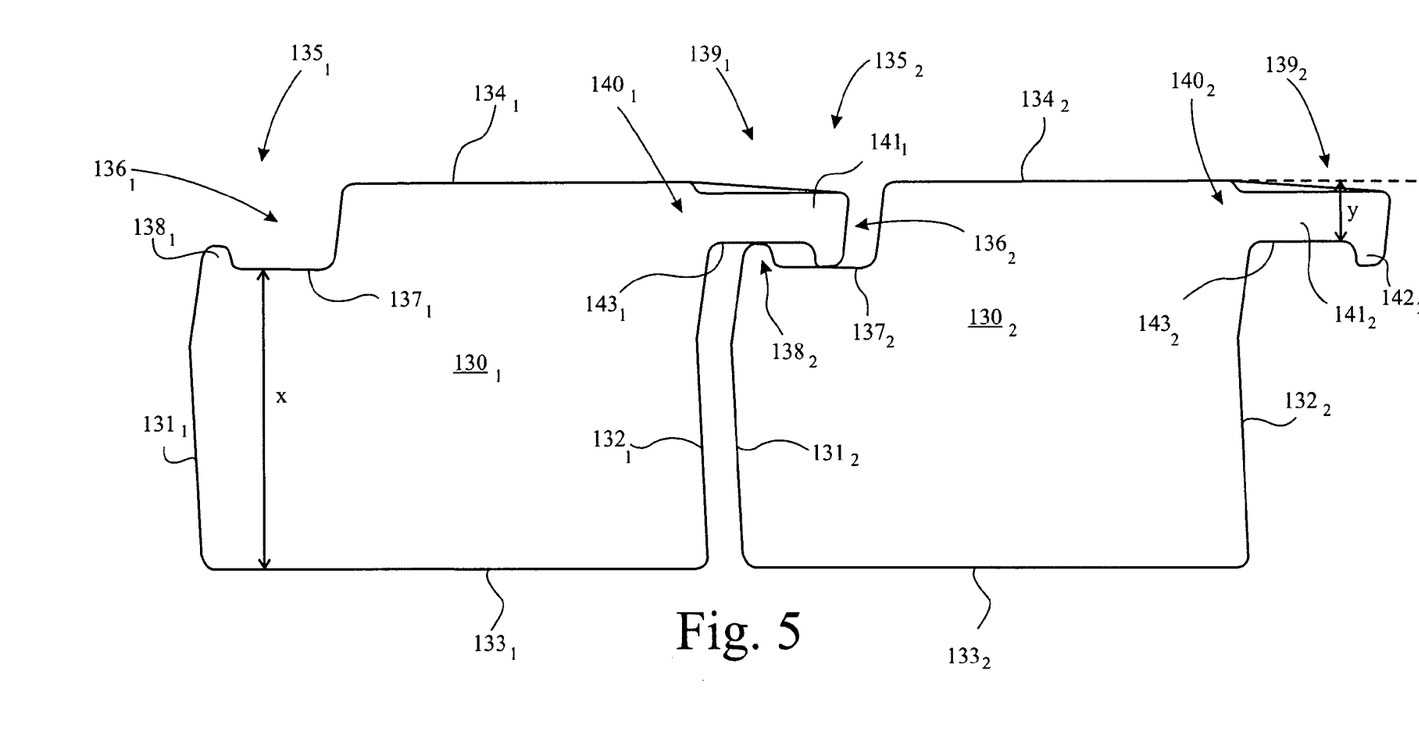
FIG. 5 illustrates an alternative profile of a pressure armour tape.

FIG. 5 illustrates a cross section of tape 130 according to a further embodiment of the present invention. The profile of the cross section has a substantially block-like nature with a first side wall 131 and a second, spaced apart and substantially parallel, side wall 132 arranged substantially perpendicular to a lower surface 133 which is substantially parallel to but spaced apart from a further upper surface 134. Two adjacent windings $130_1$, $130_2$ are illustrated interlocked in FIG. 5 with a leading edge corresponding to the right hand side wall 132 shown in FIG. 5 of a successive winding $130_1$ being interlocked with a trailing edge corresponding to the left hand side wall shown in FIG. 5 of a previous winding. An upper corner region 135 of the profile provides a "cut out" valley region 136 having a substantially planer valley floor surface 137. A lip 138 is formed between the valley floor 137 and the first side wall 131 with a section of the first side wall 131 extending linearly from the first contact surface 133 and then tapering inwardly into the lip region 138. The upper corner region 135 thus provides a concave hook region. The floor 137 of the concave hook is offset from the lower contact surface 133 in an arm region having a thickness distance x.

A convex hook 139 extends outwardly from a further upper corner region 140 in the profile with an arm 141 terminating in a further lip 142. The lip 142 of the convex hook is turned inwardly towards the centre line C of the profile whilst the lip 138 of the concave hook is turned outwardly away from the centre line C. The convex hook 139 has a substantially planer floor 143 between the convex hook lip 142 and the further side wall 132. The planer surface of the floor of the convex hook is offset by a thickness distance y from the further upper surface 134 in the profile. The distance x is greater than the distance y. Aptly x is greater than 2.5y. There is thus a difference in the thicknesses of the two arms in the profile illustrated as distances x and y. The concave hook and convex hook of the profile are disposed to one common side of an imaginary centre line C passing horizontally through the profile and thus the centre line of a layer 13 formed by the tape winding. The convex hook 139 has a recessed upper surface rather than a tapered surface as illustrated in FIGS. 3 and 4. This prevents undue pressure on the convex hook.

As illustrated in FIG. 5 the side walls 131 meet the underlying layer contact surface 33 substantially at right angles. Here it will be understood that substantially perpendicular includes the possibility of the side walls and contact surface meeting perpendicularly. Also it is to be noted as per other embodiments of the present invention the corner regions where the side walls meet the contact surface may be curved slightly so as to avoid undue pressure being exerted on an underlying layer in use. By utilising substantially upright side walls the cross sectional profile of the tape takes on a substantially block-like characteristic and maintains any asymmetry in the tape to a low level.

Figure 6:
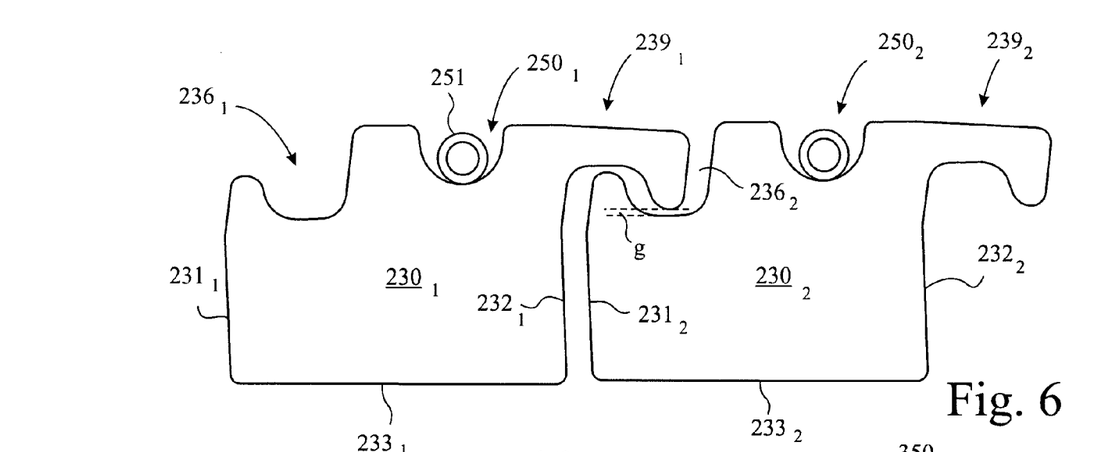
FIG. 6 illustrates an alternative profile of a pressure armour tape.
Figure 7:
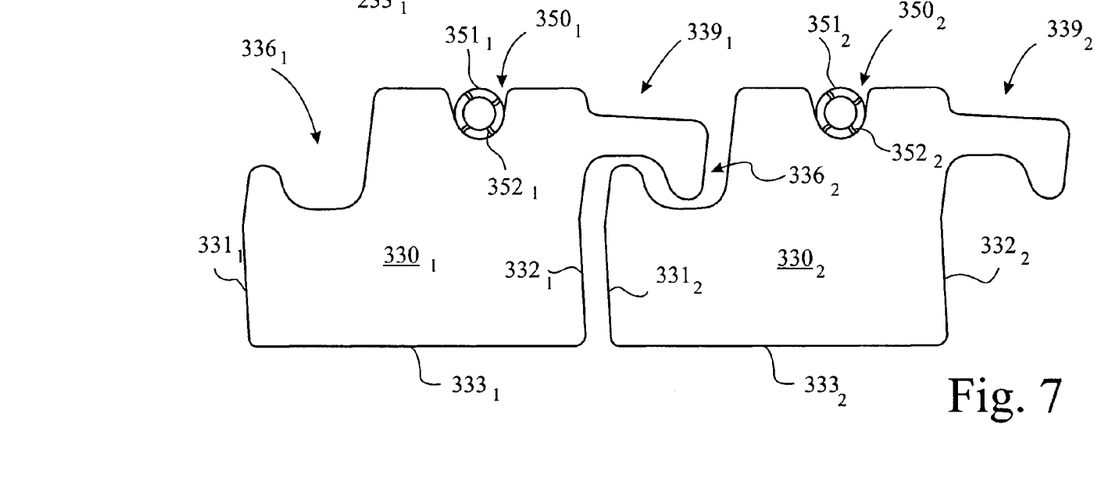
FIG. 7 illustrates an alternative profile of a pressure armour tape.

FIG. 6 and FIG. 7 illustrate further embodiments of the present invention. As illustrated in FIG. 6 a cross section of tape 230 includes parallel spaced apart side walls 231, 232 which extend upwards perpendicular to an underlying layer contact surface 233. A valley 236 is formed in an upper corner of the cross section forming a concave hook whilst a further convex hook extends outwardly from a leading edge side wall 232. The upper surface 234 in the cross section is recessed to include a generally U-shaped channel 250. This groove is thus located on an outer surface of the pressure armour layer 13 formed by interlocked windings $230_1$, $230_2$ and helps reduce weight per meter of wire. The groove may be left unoccupied so as to maximise the weight reduction or may additionally be used to receive inspection systems such as illustrated in FIG. 6 an optical fibre 251 which may be wrapped around the layer 13 subsequent to the tape 230 being helically wound around an underlying tubular element. The optical fibre can be utilised to assess stress in the wire layer. In addition to the optical fibre or as an alternative various heating/cooling systems for cooling the temperature of the pipe or permeated gas removal systems or gas/liquid introduction systems may be located in the channel 250. It will be appreciated that the cross section of the channel may be shaped so as to accommodate one or more tubes or fibres which are to be duly located therein.

FIG. 6 illustrates how the cross sectional profile of the tape may be shaped so that when the underlying layer contacts surfaces 233 are wrapped around an underlying layer a gap g may be left between the nub of the lip on the convex hook 239 and the planer floor surface of the valley. A rounded top can thus be utilised on the nub of the lip as opposed to the substantially planer nub regions of the lips shown in FIG. 5. The flat nub design can be used according to any embodiment of the present invention when pressure is expected between the contact surfaces. The flat nub helps spread a contact force.

FIG. 7 illustrates a still further embodiment of the present invention in which a cross section of a tape 330 includes a lower contact surface 333 with upwardly extending side walls 331, 332. A deep valley 336 is formed in an upper corner region of an outer contact surface advantageously to help reduce the cross sectional area (and weight), and shifting the hook position closer to the underlying contact surface 333, which has an effect on the length of the legs required to allow larger diameter pipes to bend adequately (the radius from the line of neutral pipe curvature is lowered). A channel 350 is formed in the upper contact surface between two substantially planer sections. The cross sectional shape of the channel 350 may be shaped to match an outer circumference of a gas removal tube 351. The tube 351 could include perforations 352 to enable permeated gas to drain from a pipe annulus. As an alternative the tube may be formed from a permeable material in which case the through bores 352 are not required. The gas removal tube 351 may be laid in the channel 350 on the upper surface of the tape subsequent to the layer 13 being formed by helically wrapping the tape around an underlying layer and can be used to drain permeated gas to an end fitting at one end of the flexible pipe body in order to drain a pipe annulus of gases or liquids. It will be appreciated that gases or liquids might be introduced rather than removed by a similar pipe and in this way corrosion could be controlled or corrosive chemicals removed from the annulus environment. The tubes 351 and 352 can optionally be secured in the channel 350 by means of a glue or other such fixant.

It will be appreciated that the upper contact surface of the tape may include more than one channel or that a single channel may be utilised which is large enough or shaped to receive more than one tube. It will also be appreciated that the earlier described embodiments could also include one or more channels to provide for the receipt of inspection systems, heating/cooling systems or gas removal/introduction pipes.

Aptly according to embodiments of the present invention, the tape is a metal tape having a preformed cross section. It will, however, be understood that the tape may be manufactured from any suitable material that is capable of providing required physical characteristics for an application. The tape may, for example, be carbon steel or stainless steel or an alloy of titanium, or a plastic or other non-metal material, or a composite structure with a metal or polymeric matrix.

The extreme interpretation of the difference in thickness between the floors of the convex and concave hooks and a respective lower and upper contact surface is specially designed to make the wire lie stably on the pipe and also to improve handling of the wire through pipe manufacturing processes. Also this extreme difference allows an increase of overall thickness of the wire without greatly increasing the overall width of the wire.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. Flexible pipe body for transporting production fluids, comprising:
at least one layer of helically wound tape, adjacent windings in the layer of tape being interlocked by a hooked region of a winding nested in a valley region of an adjacent winding; wherein
the tape has a cross-sectional profile comprising a substantially block-like profile having a first contact surface, parallel spaced apart side walls substantially perpendicular to the first contact surface and a further contact surface substantially parallel to the first contact surface.

2. The flexible pipe body as claimed in claim 1, wherein:
the hooked region comprises an arm portion extending outwardly from a first side region of the tape and a lip region at an end region of the arm portion, turned towards an imaginary centre line of the layer.

3. The flexible pipe body as claimed in claim 2, wherein:
for each winding, a lip region of the valley region extends upwardly towards the further contact surface and is offset from the imaginary centre line on the same side of the centre line as the lip region of the hooked region.

4. The flexible pipe body as claimed in claim 3, wherein:
the valley region comprises a flat bottomed recess in the further contact surface of the tape at a further side of the tape, a first side of the recess being formed by an edge of a body portion of the tape and a further side of the recess being formed by the valley lip region extending from a sidewall at the further side and turned away from the centre line of the layer.

5. The flexible pipe body as claimed in claim 4, wherein:
the lip region of each hooked region rests on the bottom surface of a groove of an adjacent winding.

6. The flexible pipe body as claimed in claim 1, wherein:
the hooked region is located at a leading edge of the tape in a successive winding and the valley region is located at a trailing edge of the tape in a previous winding.

7. The flexible pipe body as claimed in claim 1, wherein:
said layer has a radially inner and outer surface defined by a corresponding first and further contact surface of windings of the tape, a first contact surface of each winding being substantially planar and a further contact surface of each winding comprising a substantially planar region and a minor region corresponding to a rear surface of the hooked region radially more proximate to the imaginary centre line than the substantially planar region of the further contact surface.

8. The flexible pipe body as claimed in claim 1 wherein a lip region of each hooked region is offset from an imaginary centre line of the layer.

9. The flexible pipe body as claimed in claim 1, wherein:
a projection of a centre of gravity associated with the cross-sectional profile onto the first contact surface is substantially non-offset from a centre point on the first contact surface between the side walls.

10. The flexible pipe body as claimed in claim 9, wherein the projected centre of gravity is offset from a centre point of the contact surface by a distance less than 10% of the width of the first contact surface.

11. The flexible pipe body as claimed in claim 10, wherein said distance is less than 5% of the width of the first contact surface.

12. The flexible pipe body as claimed in claim 7, further comprising:
a groove in the planar further contact surface of each winding.

13. The flexible pipe body as claimed in claim 1, further comprising:
an internal pressure sheath, wherein said at least one layer comprises a pressure armour layer over the internal pressure sheath.

14. The flexible pipe body as claimed in claim 13 wherein said internal pressure sheath comprises a barrier layer or liner.

15. A flexible pipe comprising the flexible pipe body as claimed in claim 1 and further comprising at least one end fitting.

16. A riser, flowline or jumper comprising the flexible pipe as claimed in claim 15.

17. A method comprising transporting a fluid through a flexible pipe as claimed in claim 15.

18. An elongate metallic or polymeric or composite tape for forming a layer of interlocked windings in flexible pipe body, a cross-section of the tape comprising:
a hooked region and a valley region, a hooked region of a winding being nestable in a corresponding valley region of an adjacent winding to thereby interlock adjacent windings; and
a substantially block-like profile having a first contact surface, parallel spaced apart side walls substantially perpendicular to the first contact surface, and a further contact surface substantially parallel to the first contact surface.

19. The tape as claimed in claim 18, wherein:
the hooked region comprises an arm portion extending outwardly from a first side region of the tape and a lip region at an end region of the arm portion, turned towards an imaginary centre line of the tape.

20. The tape as claimed in claim 19, wherein a lip region of the valley region is offset from an imaginary centre line on the same side of the centre line as the lip region of the hooked region.

21. The tape as claimed in claim 18, wherein:
a projection of a centre of gravity associated with the cross-section onto the first contact surface is substantially non-offset from a centre point of the contact surface.

22. The tape as claimed in claim 21, wherein an offset between the projection of the centre of gravity and the centre point on the contact surface is a distance less than 10% of the width of the first contact surface.

23. A method of manufacturing flexible pipe body, comprising the steps of:
helically winding one or more tapes of the type as claimed in claim 18 around a substantially tubular under layer.

24. The method as claimed in claim 23 wherein the tubular under layer comprises an internal pressure sheath.

25. The method as claimed in claim 23, further comprising the steps of:
forming one or more layers over the helically wound tape.

* * * * *